(12) United States Patent
Kuwata

(10) Patent No.: US 9,247,150 B2
(45) Date of Patent: Jan. 26, 2016

(54) IMAGE CAPTURING APPARATUS, EXPOSURE CONTROL METHOD, AND COMPUTER-READABLE RECORDING MEDIUM

(71) Applicant: Kohji Kuwata, Kanagawa (JP)

(72) Inventor: Kohji Kuwata, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 157 days.

(21) Appl. No.: 14/196,041

(22) Filed: Mar. 4, 2014

(65) Prior Publication Data

US 2014/0247376 A1 Sep. 4, 2014

(30) Foreign Application Priority Data

Mar. 4, 2013 (JP) .................................. 2013-042255

(51) Int. Cl.
*H04N 5/235* (2006.01)
*H04N 5/357* (2011.01)

(52) U.S. Cl.
CPC ............. *H04N 5/2352* (2013.01); *H04N 5/235* (2013.01); *H04N 5/357* (2013.01); *H04N 5/3572* (2013.01)

(58) Field of Classification Search
CPC ..... H04N 5/235; H04N 5/357; H04N 5/2352; H04N 5/3572
See application file for complete search history.

(56) References Cited

U.S. PATENT DOCUMENTS

| | | | | |
|---|---|---|---|---|
| 5,818,527 A * | 10/1998 | Yamaguchi | .......... | H04N 3/2335 348/241 |
| 2002/0196472 A1* | 12/2002 | Enomoto | ................. | G06T 5/006 358/3.26 |
| 2003/0123710 A1* | 7/2003 | Nakazawa | ......... | G07C 9/00087 382/115 |
| 2004/0240748 A1* | 12/2004 | Matsuda | .............. | H04N 9/3182 382/274 |
| 2005/0231616 A1* | 10/2005 | Iwai | ........................ | H04N 5/217 348/241 |
| 2007/0003159 A1* | 1/2007 | Matsuda | ................. | G06T 5/009 382/275 |
| 2007/0081173 A1* | 4/2007 | Yanada | ............... | H04N 5/23212 358/1.6 |
| 2007/0206853 A1* | 9/2007 | Kim | ...................... | H04N 1/6088 382/167 |
| 2008/0062164 A1* | 3/2008 | Bassi | .................... | H04N 9/3147 345/214 |
| 2008/0310752 A1* | 12/2008 | Han | .......................... | G06T 5/20 382/274 |
| 2008/0316447 A1* | 12/2008 | Yabu | ....................... | G03B 27/42 355/53 |
| 2009/0040483 A1* | 2/2009 | Deng | ..................... | G03B 27/42 355/52 |
| 2009/0219387 A1* | 9/2009 | Marman | .......... | G08B 13/19652 348/143 |
| 2011/0128406 A1* | 6/2011 | Shirai | .................. | H04N 5/3572 348/223.1 |

FOREIGN PATENT DOCUMENTS

| | | |
|---|---|---|
| JP | 2003-107555 | 4/2003 |
| JP | 3701172 | 9/2005 |

* cited by examiner

*Primary Examiner* — Nicholas Giles
*Assistant Examiner* — Abdelaaziz Tissire
(74) *Attorney, Agent, or Firm* — Oblon, McClelland, Maier & Neustadt, L.L.P.

(57) ABSTRACT

An image capturing apparatus includes an image capturing module and a controller that controls exposure of the image capturing module by dividing a captured image by the image capturing module into a plurality of image areas, weighting brightness of a predetermined pixel in each of the image areas, and being based on the weighted brightness of the predetermined pixel in each image area. The controller performs a weighting correction process that increases weighting to the brightness of the predetermined pixel in each image area when the size of the image area after a correction process in which distortion aberration of the captured image is corrected is larger than the size of the before-corrected image area, and decreases the weighting to the brightness of the predetermined pixel in each image area when the size of the after-corrected image area is smaller than the size of the before-corrected image area.

7 Claims, 7 Drawing Sheets

| 05 | 07 | 0A | 0B | 0D | 0B | 0A | 07 | 05 |
|----|----|----|----|----|----|----|----|----|
| 08 | 09 | 0D | 0E | 10 | 0E | 0D | 09 | 08 |
| 09 | 0B | 17 | 27 | 3F | 27 | 17 | 0B | 09 |
| 0A | 0D | 23 | 52 | 64 | 52 | 23 | 0D | 0A |
| 0A | 0D | 23 | 52 | 64 | 52 | 23 | 0D | 0A |
| 09 | 0B | 17 | 27 | 32 | 27 | 17 | 0B | 09 |
| 05 | 0A | 0D | 11 | 13 | 11 | 0D | 0A | 05 |

(b)

| 07 | 0C | 0E | 10 | 13 | 10 | 0E | 0C | 07 |
|----|----|----|----|----|----|----|----|----|
| 0D | 10 | 16 | 1C | 1F | 1C | 16 | 10 | 0D |
| 12 | 19 | 21 | 32 | 47 | 32 | 21 | 19 | 12 |
| 14 | 1C | 2B | 52 | 64 | 52 | 2B | 1C | 14 |
| 14 | 1C | 2B | 52 | 64 | 52 | 2B | 1C | 14 |
| 12 | 19 | 21 | 32 | 38 | 32 | 21 | 19 | 12 |
| 11 | 14 | 18 | 1C | 1F | 1C | 18 | 14 | 11 |

(c)

| 03 | 04 | 07 | 0B | 0E | 10 | 0E | 0D | 07 |
|----|----|----|----|----|----|----|----|----|
| 04 | 05 | 09 | 14 | 1B | 21 | 1B | 14 | 04 |
| 06 | 08 | 0E | 26 | 47 | 4E | 47 | 26 | 12 |
| 07 | 09 | 13 | 32 | 58 | 32 | 58 | 32 | 14 |
| 06 | 08 | 0E | 26 | 47 | 4E | 47 | 26 | 12 |
| 04 | 05 | 09 | 14 | 1B | 21 | 1B | 14 | 04 |
| 03 | 04 | 07 | 0B | 0E | 10 | 0E | 0D | 07 |

(d)

| 03 | 05 | 06 | 08 | 09 | 08 | 06 | 05 | 03 |
|----|----|----|----|----|----|----|----|----|
| 06 | 08 | 09 | 0B | 0C | 0B | 09 | 08 | 06 |
| 09 | 0E | 13 | 19 | 21 | 19 | 13 | 0E | 09 |
| 0C | 10 | 1F | 32 | 4E | 32 | 1F | 10 | 0C |
| 0D | 14 | 43 | 59 | 64 | 59 | 43 | 14 | 0D |
| 0C | 10 | 26 | 32 | 38 | 32 | 26 | 10 | 0C |
| 03 | 0E | 13 | 19 | 1C | 19 | 13 | 0E | 03 |

FIG.4
CAPTURED IMAGE BEFORE CORRECTING
DISTORTION ABERRATION
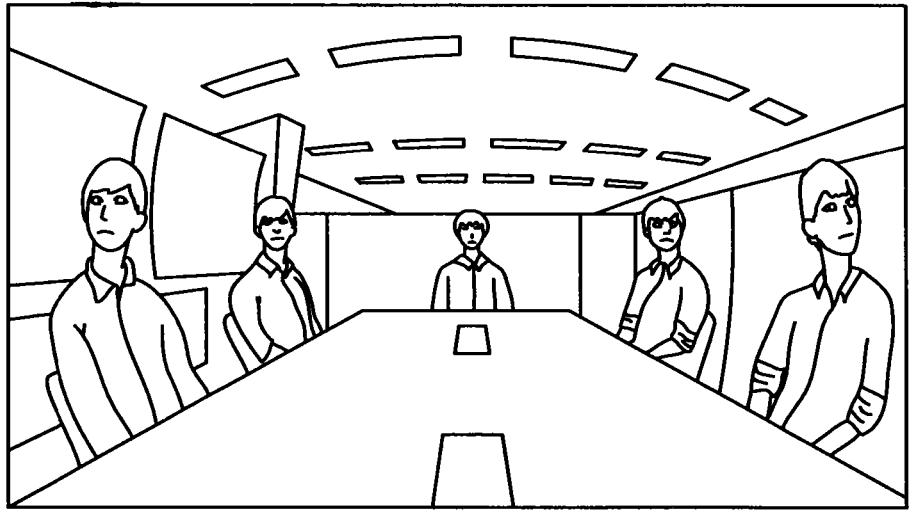
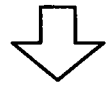
CAPTURED IMAGE AFTER CORRECTING
DISTORTION ABERRATION
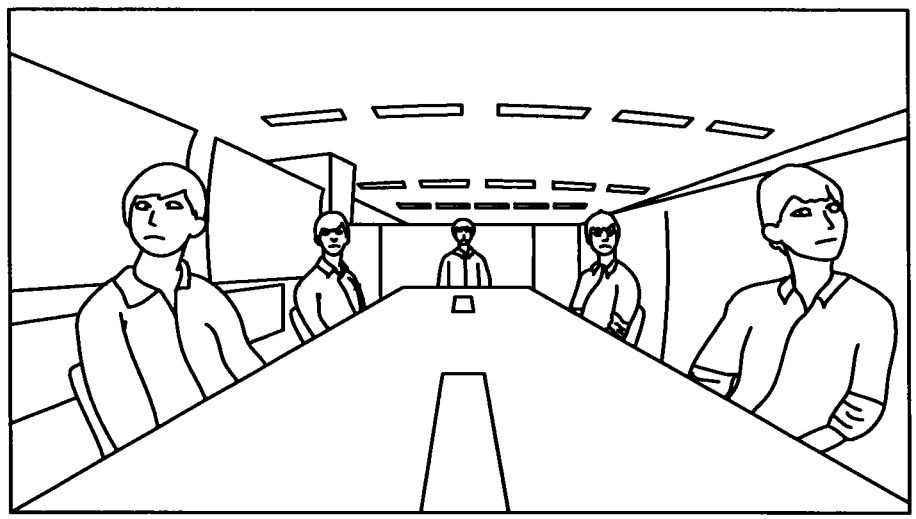

FIG.5
CAPTURED IMAGE BEFORE CORRECTING DISTORTION ABERRATION
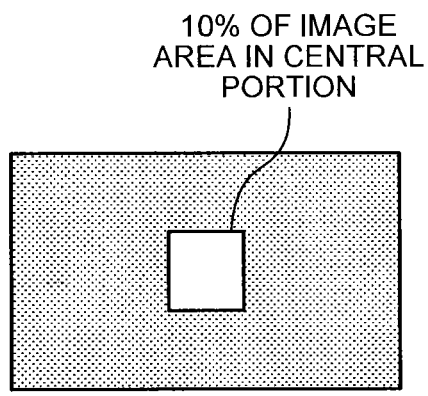
10% OF IMAGE AREA IN CENTRAL PORTION
CAPTURED IMAGE AFTER CORRECTING DISTORTION ABERRATION
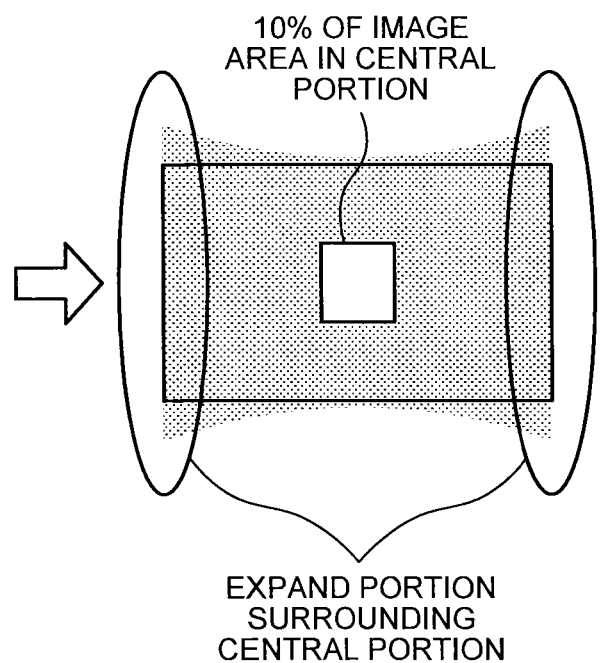
10% OF IMAGE AREA IN CENTRAL PORTION
EXPAND PORTION SURROUNDING CENTRAL PORTION

IMAGE AREAS BEFORE CORRECTING
DISTORTION ABERRATION

| x1 | x2 | x3 | x4 | x5 | x6 | x7 | x8 | x9 | x10 | x11 | x12 | x13 |
|---|---|---|---|---|---|---|---|---|---|---|---|---|
| x14 | x15 | x16 | x17 | x18 | x19 | x20 | x21 | x22 | x23 | x24 | x25 | x26 |
| x27 | x28 | x29 | x30 | x31 | x32 | x33 | x34 | x35 | x36 | x37 | x38 | x39 |
| x40 | x41 | x42 | x43 | x44 | x45 | x46 | x47 | x48 | x49 | x50 | x51 | x52 |
| x53 | x54 | x55 | x56 | x57 | x58 | x59 | x60 | x61 | x62 | x63 | x64 | x65 |

IMAGE AREAS AFTER CORRECTING
DISTORTION ABERRATION

FIG.7
CAPTURED IMAGE BEFORE
CORRECTING DISTORTION
ABERRATION
CAPTURED IMAGE AFTER
CORRECTING DISTORTION
ABERRATION
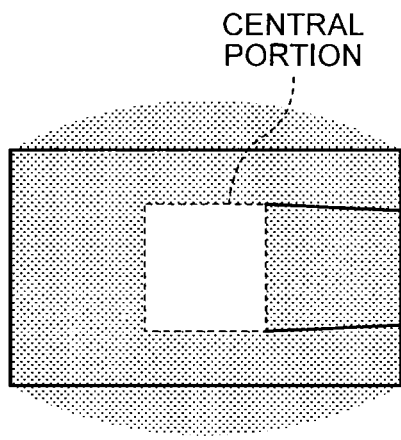
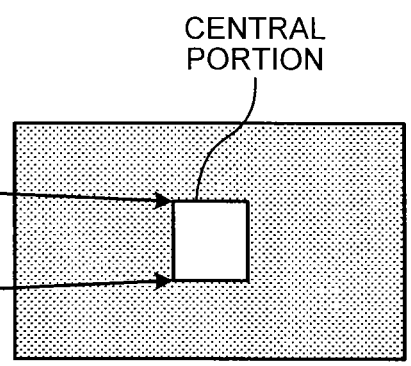

IMAGE CAPTURING APPARATUS, EXPOSURE CONTROL METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2013-042255 filed in Japan on Mar. 4, 2013.

BACKGROUND OF THE INVENTION

1. Field of the Invention

The present invention relates to an image capturing apparatus, an exposure control method, and a computer-readable recording medium.

2. Description of the Related Art

Conventional technologies for controlling exposure in an image capturing apparatus such as a digital camera include a multi-zone metering method that divides a captured image captured and acquired by the image capturing apparatus into a plurality of photometric areas (one example of an image area) and controls the exposure based on the photometric results of the respective photometric areas, a center-weighted metering method that controls the exposure by weighting the brightness of a central portion of the captured image (one example of an image area), a partial metering method that performs photometry on several tens of percent of the captured image in a central portion (one example of an image area) and controls the exposure based on the photometric result thereof, and a spot metering method that performs photometry on several percent of the captured image in a central portion (one example of an image area) and controls the exposure based on the photometric result thereof.

As for the image capturing apparatus used in a television conference system (also referred to as a teleconference system and a video conference system) or the like, an image capturing apparatus equipped with a wide-angle lens is used to capture a wide range so as to capture the images of all of the participants in a conference or to convey a realistic feeling of the conference venue. The captured image captured and acquired by the image capturing apparatus having a wide-angle lens results in a distorted captured image due to the characteristics of the wide-angle lens, and thus the captured image is not transmitted to a destination as it is, but transmitted to the destination in a state of the distortion being suppressed by adding a geometrical deformation to the captured image. When the geometrical distortion is added to the captured image, however, the size of the captured image varies, and thus when the exposure is controlled based on the brightness of the captured image before adding the geometrical deformation without considering the variation, optimal exposure control may not be made.

In view of the foregoing, there is a need to provide an image capturing apparatus, an exposure control method, and a computer-readable recording medium having a computer program that permit optimal exposure control to be achieved when distortion aberration of a captured image captured and acquired by an image capturing module is corrected.

SUMMARY OF THE INVENTION

It is an object of the present invention to at least partially solve the problems in the conventional technology.

According to the present invention, there is provided an image capturing apparatus comprising: an image capturing module; and a controller configured to control exposure of the image capturing module by dividing a captured image captured and acquired by the image capturing module into a plurality of image areas, weighting brightness of a predetermined pixel in each of the image areas, and being based on the weighted brightness of the predetermined pixel in each image area, wherein the controller performs a weighting correction process that increases weighting to the brightness of the predetermined pixel in each image area, when a size of the image area after a correction process in which distortion aberration of the captured image is corrected is larger than the size of the image area before the correction process, and the controller performs a weight correction process that decreases the weighting to the brightness of the predetermined pixel in each image area, when the size of the image area after the correction process is smaller than the size of the image area before the correction process.

The present invention also provides an exposure control method performed by an image capturing apparatus, the exposure control method comprising: controlling exposure of the image capturing apparatus by a controller dividing a captured image captured and acquired by the image capturing apparatus into a plurality of image areas, weighting brightness of a predetermined pixel in each of the image areas, and being based on the weighted brightness of the predetermined pixel in each image area, wherein the controller performs a weighting correction process that increases weighting to the brightness of the predetermined pixel in each image area, when a size of the image area after a correction process in which distortion aberration of the captured image is corrected is larger than the size of the image area before the correction process, and the controller performs a weighting correction process that decreases the weighting to the brightness of the predetermined pixel in each image area, when the size of the image area after the correction process is smaller than the size of the image area before the correction process.

The present invention also provides a non-transitory computer-readable recording medium that contains a computer program that causes a computer to function as: a controller configured to control exposure of an image capturing module by dividing a captured image captured and acquired by the image capturing module into a plurality of image areas, weighting brightness of a predetermined pixel in each of the image areas, and being based on the weighted brightness of the predetermined pixel in each image area, wherein the controller performs a weighting correction process that increases weighting to the brightness of the predetermined pixel in each image area, when a size of the image area after a correction process in which distortion aberration of the captured image is corrected is larger than the size of the image area before the correction process, and the controller performs a weighting correction process that decreases the weighting to the brightness of the predetermined pixel in each image area, when the size of the image area after the correction process is smaller than the size of the image area before the correction process.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 3(a) to 3(d) are tables for explaining weighting to the brightness representing each image area performed in the image capturing apparatus in the embodiment;

FIG. 4 is a diagram for explaining a process of correcting distortion aberration performed in the image capturing apparatus in the embodiment;

FIG. 5 is a diagram for explaining the process of correcting distortion aberration performed in the image capturing apparatus in the embodiment;

FIG. 7 is a diagram for explaining exposure control performed in the image capturing apparatus in the embodiment.

DETAILED DESCRIPTION OF THE PREFERRED EMBODIMENT

With reference to the accompanying drawings, an exemplary embodiment of an image capturing apparatus, an exposure control method, and a computer-readable recording medium having a computer program according to the present invention will be described in detail hereinafter.

Figure 1:
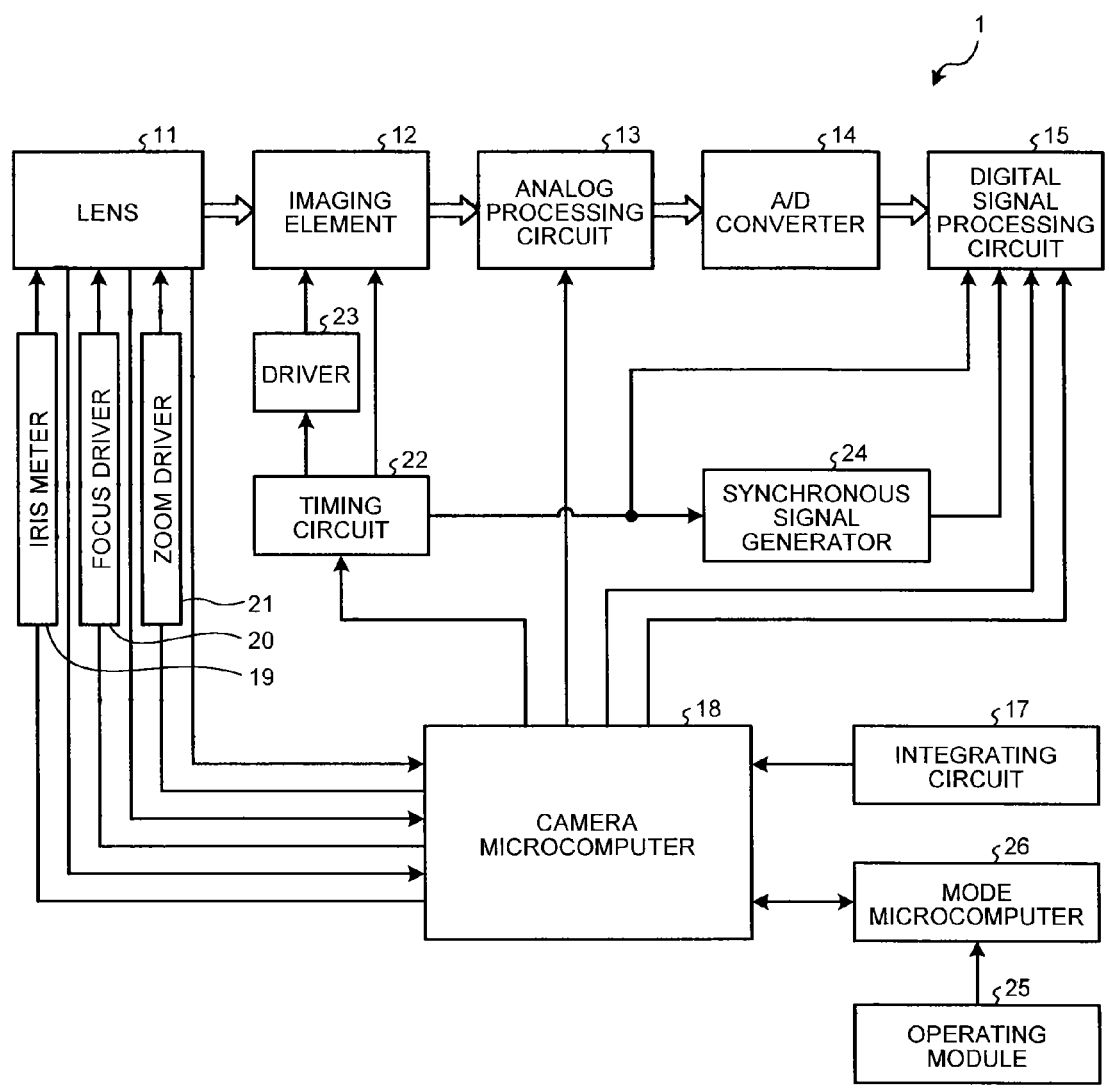
FIG. 1 is a block diagram illustrating a configuration of an image capturing apparatus according to an embodiment of the present invention.

FIG. 1 is a block diagram illustrating a configuration of an image capturing apparatus according to the embodiment. An image capturing apparatus 1 according to the embodiment includes a lens 11, an imaging element 12, an analog processing circuit 13, an A/D converter 14, a digital signal processing circuit 15, an integrating circuit 17, a camera microcomputer 18, an iris meter 19, a focus driver 20, a zoom driver 21, a timing circuit 22, a driver 23, a synchronous signal generator 24, an operating module 25, and a mode microcomputer 26.

The lens 11 forms an image of a subject on the imaging element 12. The imaging element 12 is a charge coupled device (CCD) image sensor, a complementary metal-oxide semiconductor (CMOS) image sensor, or the like on which the image of the subject (a captured image) is formed by the lens 11, and outputs an analog signal of the captured image formed (hereinafter referred to as an image capturing signal). In the embodiment, the imaging element 12 outputs the image capturing signal of the captured image formed. In the embodiment, the lens 11 and the imaging element 12 together serve as an image capturing module that captures the image of a subject.

The analog processing circuit 13 performs a sample-and-hold process that reduces noise in the image capturing signal output from the imaging element 12, and performs gain adjustment of the image capturing signal output from the imaging element 12. In the embodiment, the analog processing circuit 13 performs correlated double sampling (CDS) to reduce the noise in the image capturing signal output from the imaging element 12. In the embodiment, the analog processing circuit 13 further performs automatic gain control (AGC) to adjust the gain of the image capturing signal output from the imaging element 12.

The analog/digital (A/D) converter 14 converts the image capturing signal in an analog form output from the imaging element 12 into an image capturing signal in a digital form.

The digital signal processing circuit 15 converts the digital image capturing signal converted by the A/D converter 14 into a video signal. The digital signal processing circuit 15 then outputs the converted video signal to a display device (for example, a view finder and an external television receiver) that displays an image (captured image) derived from the video signal, to a storage module that stores therein the video signal, and to others. In the embodiment, the digital signal processing circuit 15 outputs the video signal by converting into an analog signal by a D/A converter. Furthermore, in the embodiment, the digital signal processing circuit 15, being controlled by the camera microcomputer 18, adjusts white balance of the image derived from the converted video signal.

The integrating circuit 17 acquires the brightness of the image derived from the video signal (captured image) output from the digital signal processing circuit 15 as control information used for exposure control (AE: automatic exposure) of the image capturing apparatus 1. In the embodiment, the integrating circuit 17 further acquires control information used for automatic focus (AF: autofocus) that automatically adjusts the focus of the image capturing apparatus 1 and for white balance adjustment (AWB: automatic white balance) using the video signal output from the digital signal processing circuit 15. The integrating circuit 17 then outputs the acquired control information to the camera microcomputer 18.

The iris meter 19 adjusts the diaphragms of the lens 11 according to an iris operation signal used for the iris adjustment of the lens 11. The focus driver 20 adjusts the focus of the image capturing apparatus 1 according to a focus operation signal used for the focus adjustment of the image capturing apparatus 1. The zoom driver 21 adjusts the focal length of the lens 11 according to a zoom operation signal used for the adjustment of the focal length of the lens 11.

The driver 23 activates an electronic shutter of the imaging element 12. The synchronous signal generator 24 outputs a synchronous signal to convert the image capturing signal in a digital form into the video signal in synchronization with the timing of the image being formed on the imaging element 12.

The timing circuit 22 controls the timing of opening the electronic shutter of the imaging element 12 (timing of forming the image on the imaging element 12), and the timing of converting the image capturing signal in a digital form into the video signal.

The operating module 25 can input various settings for the image capturing apparatus 1. As the various settings, there are included: a setting to switch on or off the exposure control of the image capturing apparatus 1; a setting to select a determining method (for example, a multi-zone metering method, a center-weighted metering method, a partial metering method, and a spot metering method) of exposure (a shutter speed, an exposure time, and others) when the exposure control (AE) of the image capturing apparatus 1 is set to on; a setting to switch on or off the white balance adjustment (AWB); a setting to switch on or off the autofocus of the image capturing apparatus 1; a setting to switch on or off the adjustment of the diaphragms of the lens 11; a setting to switch on or off the adjustment of the focal length of the lens 11; and so on. The mode microcomputer 26 sets the various settings received from the operating module 25 to the image capturing apparatus 1.

The camera microcomputer 18 controls the various modules of the image capturing apparatus 1. More specifically, the camera microcomputer 18 controls the timing circuit 22 according to the control information output from the integrating circuit 17 to control the exposure of the image capturing apparatus 1. The camera microcomputer 18 further controls the digital signal processing circuit 15 according to the control information output from the integrating circuit 17 to control the adjustment of the white balance of the image derived from the video signal.

Furthermore, the camera microcomputer 18 outputs the focus operation signal to the focus driver 20 according to the control signal output from the integrating circuit 17 and the focus detected by a focus-lens position sensor so as to control the focusing of the image capturing apparatus 1. The camera microcomputer 18 further outputs the iris operation signal to the iris meter 19 according to an aperture value of the lens 11 detected by an iris opening sensor (a hall element) to control the adjustment of the diaphragms of the lens 11. Moreover, the camera microcomputer 18 outputs the zoom operation signal to the zoom driver 21 according to the focal length of the lens 11 detected by a zoom-lens position sensor to control the adjustment of the focal length of the lens 11.

Figure 2:
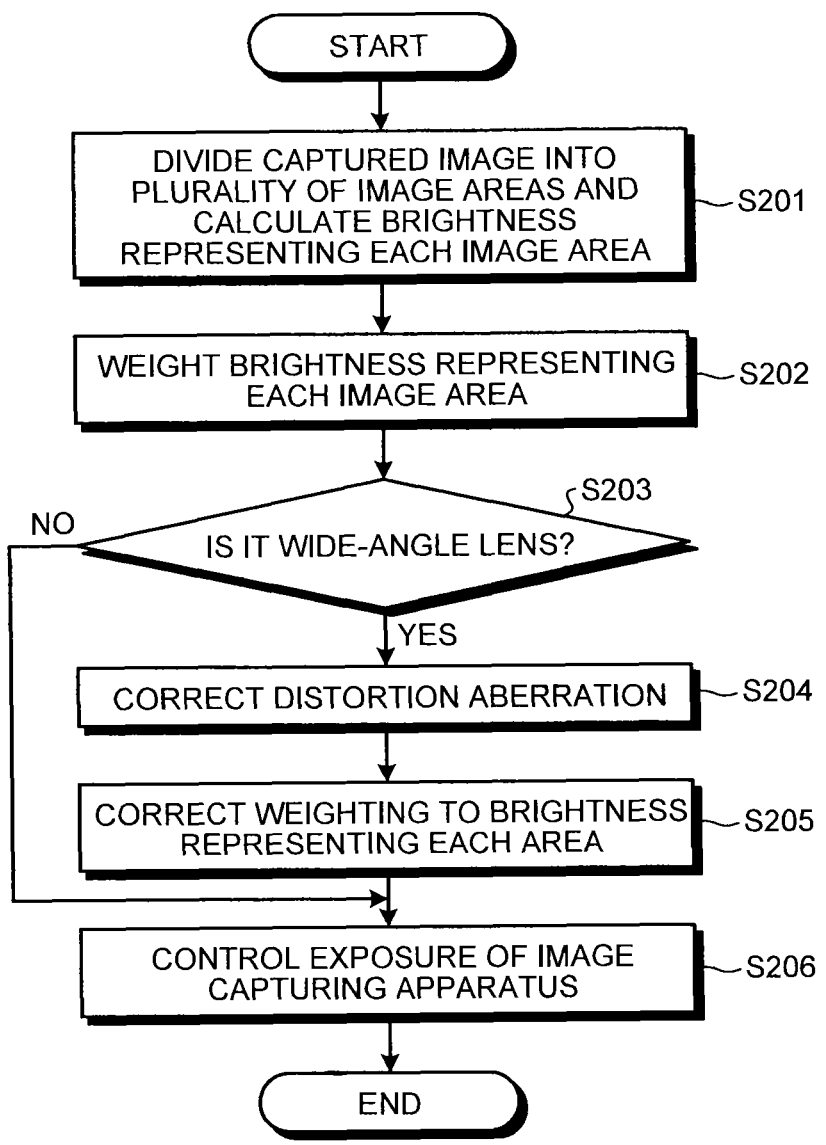
FIG. 2 is a flowchart illustrating a sequence of a process performed to control exposure in the image capturing apparatus in the embodiment.

A process performed to control the exposure of the image capturing apparatus 1 in the embodiment will now be described in detail. FIG. 2 is a flowchart illustrating a sequence of the process to control the exposure performed in the image capturing apparatus in the embodiment.

When the exposure control of the image capturing apparatus 1 is set to be on by the mode microcomputer 26, the integrating circuit 17 acquires the video signal output from the digital signal processing circuit 15, divides a captured image derived from the video signal acquired (in other words, the captured image displayed on the display device) into a plurality of image areas, and calculates the brightness that represents each of the image areas (Step S201).

In the embodiment, the integrating circuit 17 divides the captured image derived from the acquired video signal into a plurality of image areas (for example, 63 image areas). The integrating circuit 17 then calculates, for each image area, an integrated value of the brightness of a plurality of pixels included in an image area as the brightness representing the image area. While the integrating circuit 17 calculates the integrated value of the brightness of the pixels included in the image area as the brightness representing the image area in the embodiment, it is not restricted to this. For example, the integrating circuit 17 may calculate the average of the brightness of the pixels included in an image area as the brightness representing the image area. That is, the brightness representing an image area may be being used as is the brightness of pixels included in the image area, being calculated using a predetermined expression, or being in other ways. Furthermore, the brightness representing an image area may be the brightness of a single pixel or a plurality of pixels included in the image area (more specifically, a predetermined pixel in the image area).

In the embodiment, when the brightness representing each of the image areas is calculated, the integrating circuit 17 further calculates the integrated value of the brightness representing each of the image areas calculated (in other words, the brightness of the whole captured image) as the brightness representing the captured image.

When the integrating circuit 17 calculates the brightness representing each image area, the camera microcomputer 18 weights the brightness representing each image area (Step S202). In the embodiment, the camera microcomputer 18 weights the brightness representing each image area by multiplying the brightness representing the image area thereof by a weighting coefficient.

While the camera microcomputer 18 weights the brightness representing each image area by multiplying the brightness representing the image area thereof by the weighting coefficient in the embodiment, it is not restricted to this. For example, the camera microcomputer 18 may add a correction value preset to each of the image areas to the brightness representing the image area, thereby the camera microcomputer 18 weights the brightness representing each image area.

Now, with reference to FIG. 3, weighting to the brightness representing image areas is described. FIGS. 3(*a*) to 3(*d*) are tables for explaining the weighting to the brightness representing each of the image areas performed in the image capturing apparatus in the embodiment. In the embodiment, the camera microcomputer 18 differentiates, for each of the image areas, a correction value to be added to the brightness representing an image area, according to the determining method of exposure set by the mode microcomputer 26. For example, when the determining method of exposure set by the mode microcomputer 26 is a bottom-weighted metering method that optimizes the exposure for a lower portion of the captured image, the camera microcomputer 18 increases the correction value to be added to the brightness representing the image areas in the lower portion of the captured image. Consequently, as illustrated in FIG. 3(*a*), the camera microcomputer 18 can optimize the exposure for the image areas in the lower portion of the captured image.

Furthermore, when the determining method of exposure set by the mode microcomputer 26 is a center-weighted metering method that optimizes the exposure for a central portion of the captured image, the camera microcomputer 18 increases the correction values to be added to the brightness representing the image areas in the central portion of the captured image. Consequently, as illustrated in FIGS. 3(*b*), 3(*c*) and 3(*d*), the camera microcomputer 18 can optimize the exposure for the image areas in the central portion of the captured image.

Referring back to FIG. 2, the camera microcomputer 18 determines whether or not the lens 11 is a wide-angle lens based on the focal length of the lens 11 detected by the zoom-lens position sensor (Step S203). In the embodiment, the camera microcomputer 18 is assumed to determine that the lens 11 is a wide-angle lens when the focal length of the lens 11 detected by the zoom-lens position sensor is shorter than a predetermined focal length. While the camera microcomputer 18 uses the focal length of the lens 11 detected by the zoom-lens position sensor to determine whether the lens 11 is a wide-angle lens in the embodiment, it is not restricted to this. For example, the camera microcomputer 18 may determine whether the lens 11 is a wide-angle lens by using the focal length of the lens 11 received from the outside of the image capturing apparatus 1 or a parameter acquirable from the lens 11.

When the lens 11 is determined to be a wide-angle lens as the focal length of the lens detected is shorter than the predetermined focal length (Yes at Step S203), the camera microcomputer 18 performs a correction process to correct distortion aberration of the captured image derived from the video signal output from the digital signal processing circuit 15 (Step S204). In the embodiment, the camera microcomputer 18 included in the image capturing apparatus 1 performs the correction process to correct the distortion aberration of the captured image. However it is not restricted to this. A device external to the image capturing apparatus 1 (for example, a display device that displays the captured image) may perform the correction process to correct the distortion aberration of the captured image.

FIGS. 4 and 5 are diagrams for explaining the process of correcting distortion aberration performed in the image capturing apparatus in the embodiment. In the embodiment, when the camera microcomputer 18 corrects the distortion in which the central portion of the captured image before the correction is distorted to bulge outward (what is called barrel distortion) as illustrated in FIG. 4, the camera microcomputer 18 performs at least one of reducing the image areas in the central portion of the captured image and expanding the image areas surrounding the central portion of the captured image. Consequently, the camera microcomputer 18 corrects the distortion aberration of the captured image derived from the video signal output from the digital signal processing circuit 15.

In the embodiment, the camera microcomputer 18 changes the correction method to correct the distortion aberration of the captured image in response to the determining method of exposure set by the mode microcomputer 26. For example, when the determining method of exposure in the image capturing apparatus 1 is a center-weighted metering method that increases the weighting to the brightness representing the image areas in the central portion of the captured image, as illustrated in FIG. 5, the camera microcomputer 18 does not perform the reduction on the central portion of the captured image (for example, 10% of the central portion of the captured image) out of a plurality of image areas into which the captured image is divided, but performs the expansion on the image areas surrounding the central portion of the captured image to correct the distortion aberration of the captured image.

While the camera microcomputer 18 corrects the distortion aberration of the captured image without correcting the image areas in the central portion of the captured image in the embodiment, the amount of correction for the central portion of the captured image rendered by the process of correcting distortion aberration for the captured image only needs to be smaller than the amount of correction for the image areas surrounding the central portion of the captured image. Consequently, when the exposure is controlled based on the central portion of the captured image, the amount of variation in weighting to the brightness of the central portion of the captured image in response to the correction of distortion aberration can be made small, and thus the exposure can be controlled based on the brightness close to the brightness of the central portion of the captured image before the distortion aberration is corrected.

Referring back to FIG. 2, the camera microcomputer 18 corrects the weighting to the brightness representing each of the image areas included in the captured image, based on the size of the image area included in the captured image before the process of correcting distortion aberration and the size of the image area included in the captured image after the process of correcting distortion aberration (Step S205). More specifically, the camera microcomputer 18 performs the process of increasing the weighting to the brightness representing each image area, when the size of the image area after the process of correcting distortion aberration is larger than the size of the image area before the process of correcting distortion aberration. And, the camera microcomputer 18 performs the process of decreasing the weighting to the brightness representing each image area, when the size of the image area after the process of correcting distortion aberration is smaller than the size of the image area before the process of correcting distortion aberration (hereinafter referred to as a weighting correction process). Consequently, even when the sizes of each image area included in the captured image before and after the process of correcting distortion aberration differ by the correction of the distortion aberration of the captured image, the degree of brightness representing each image area reflected on the exposure control can be made as a value corresponding to the size of the image area, and thus optimal exposure control can be made. More specifically, when the size of the image area is increased by the process of correcting distortion aberration, increasing the weighting to the image area can increase the degree of brightness of the increased image area reflected on the exposure control, permitting the optimal exposure control to be made. Furthermore, when the size of the image area is decreased by the process of correcting distortion aberration, decreasing the weighting to the image area can decrease the degree of brightness of the decreased image area reflected on the exposure control, permitting the optimal exposure control to be made.

In the embodiment, the camera microcomputer 18 calculates, for each of the image areas included in the captured image, an area ratio obtained by dividing the size of the image area after the process of correcting distortion aberration by the size of the image area before the process of correcting distortion aberration. The camera microcomputer 18 then multiplies a weighting coefficient, by which the brightness representing each image area is multiplied, by the area ratio calculated for each image area to perform the weighting correction process in which the weighting to the brightness representing each image area is corrected.

Figure 6:
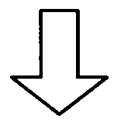
FIG. 6 is a diagram for explaining a weighting correction process performed in the image capturing apparatus in the embodiment.

FIG. 6 is a diagram for explaining the weighting correction process performed in the image capturing apparatus in the embodiment. For example, as illustrated in FIG. 6, when the correction is made by reducing the image areas in a central portion of the captured image out of a plurality of image areas x1 to x65 included in a captured image, and by expanding the image areas surrounding the central portion of the captured image, the camera microcomputer 18 divides the size of the image area x33 after the process of correcting distortion aberration by the size of the image area x33 before the process of correcting distortion aberration, thereby the area ratio (for example, 1/3) is calculated. The camera microcomputer 18 then multiplies the area ratio of 1/3 calculated for the image area x33 by the weighting coefficient, by which the brightness representing the image area x33 is multiplied, to perform the weighting correction process in which the weighting to the brightness representing the image area x33 is corrected. The camera microcomputer 18 further performs the weighting correction process on the other image areas included in the captured image in the same manner.

Referring back to FIG. 2, the camera microcomputer 18 controls the exposure of the image capturing apparatus 1 based on the brightness representing each image area on which the weighting correction process was performed (Step S206). Meanwhile, when the lens 11 is not determined to be a wide-angle lens (No at Step S203), the camera microcomputer 18 controls the exposure of the image capturing apparatus 1 based on the weighted brightness representing each image area (more specifically, the brightness representing each image area on which the weighting correction process was not performed) (Step S206).

In the embodiment, the camera microcomputer 18 controls the timing circuit 22 to adjust the exposure time of the imaging element 12 so as to control the exposure of the image capturing apparatus 1. For example, when the determining method of exposure set by the mode microcomputer 26 is a center-weighted metering method, the camera microcomputer 18 calculates an average value of the brightness representing a plurality of image areas on which the weighting correction process has been performed, and adjusts the exposure time based on the average value calculated. In the embodiment, the camera microcomputer 18 and the integrating circuit 17 together serve as a controller.

FIG. 7 is a diagram for explaining the exposure control performed in the image capturing apparatus in the embodiment. When the determining method of exposure set by the mode microcomputer 26 is a partial metering method (or a spot metering method) and the size of the image areas in a central portion (focused portion) of the captured image is reduced to correct distortion aberration as illustrated in FIG.

7, the camera microcomputer 18 controls the exposure of the image capturing apparatus 1 based only on the brightness representing the image areas in the central portion of the captured image for which the distortion aberration has been corrected (for example, 10% of the central portion of the captured image for which the distortion aberration was corrected), out of a plurality of image areas on which the weighting correction process has been performed. As a consequence, the brightness of the image areas surrounding the central portion of the captured image is not reflected on the exposure control, and thus the exposure for the central portion of the captured image can be an optimum exposure.

As in the foregoing, the image capturing apparatus 1 according to the embodiment performs the weighting correction process in which the weighting to the brightness representing each image area is increased, when the size of the image area after the process of correcting distortion aberration for the captured image is larger than the size of the image area before the correction process, and when the size of each image area after the correction process is smaller than the size of the image area before the correction process, the weighting to the brightness representing the image area is decreased. This permits the degree of brightness representing each image area reflected on the exposure control to be made as a value corresponding to the size of the respective image areas even when the sizes of the image area included in the captured image before and after the process of correcting distortion aberration differ by the correction of distortion aberration of the captured image, and thus when the distortion aberration of the captured image is corrected, the optimal exposure control can be made.

The program executed in the image capturing apparatus 1 in the embodiment is embedded in advance and provided in a read only memory (ROM) or the like.

The program executed in the image capturing apparatus 1 in the embodiment may be recorded and provided in a computer readable recording medium such as a compact disc read only memory (CD-ROM), a flexible disk (FD), a compact disc recordable (CD-R), and a digital versatile disc (DVD), as an installable or executable file.

The program executed in the image capturing apparatus 1 in the embodiment may be stored in a computer connected to a network such as the Internet and provided being downloaded via the network. Furthermore, the program executed in the image capturing apparatus 1 in the embodiment may be provided or distributed via a network such as the Internet.

The program executed by the image capturing apparatus in the embodiment is modularly configured including the controller, and as the actual hardware, a central processing unit (CPU) reads out the program from the ROM and executes the program to load and generate the controller on a main storage device.

The present invention has an advantageous effect of permitting optimal exposure control to be achieved when the distortion aberration of a captured image captured and acquired by an image capturing module is corrected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image capturing apparatus comprising:
   an image capturing module; and
   a controller configured to control exposure of the image capturing module by dividing a captured image captured by the image capturing module into a plurality of image areas, weighting brightness of a predetermined pixel in each of the image areas, and being based on the weighted brightness of the predetermined pixel in each image area, wherein
   the controller performs a weighting correction process that increases weighting to the brightness of the predetermined pixel in each image area, when a size of the image area after a correction process in which distortion aberration of the captured image is corrected is larger than the size of the image area before the correction process, and
   the controller performs a weight correction process that decreases the weighting to the brightness of the predetermined pixel in each image area, when the size of the image area after the correction process is smaller than the size of the image area before the correction process.

2. The image capturing apparatus according to claim 1, wherein
   the controller weights the brightness of a predetermined pixel in each image area by multiplying the brightness of the predetermined pixel in each image area by a weighting coefficient, and
   the weighting correction process multiplies the weighting coefficient by an area ratio obtained by dividing the size of the image area after the correction process by the size of the image area before the correction process.

3. The image capturing apparatus according to claim 1, wherein
   the controller performs the weighting correction process, when a lens included in the image capturing module is a wide-angle lens having a focal length shorter than a predetermined focal length.

4. The image capturing apparatus according to claim 1, wherein
   the controller makes an amount of correction by the correction process for a central portion of the captured image smaller than the amount of correction by the correction process for a portion surrounding the central portion of the captured image, when it is used a center-weighted metering method that increases the weighting to the brightness of a predetermined pixel in the image area in the central portion of the captured image.

5. The image capturing apparatus according to claim 1, wherein
   the controller controls the exposure of the image capturing module based only on the brightness of a predetermined pixel in the image areas in a central portion of the captured image after the correction process.

6. An exposure control method performed by an image capturing apparatus, the exposure control method comprising:
   controlling exposure of the image capturing apparatus by a controller dividing a captured image captured by the image capturing apparatus into a plurality of image areas, weighting brightness of a predetermined pixel in each of the image areas, and being based on the weighted brightness of the predetermined pixel in each image area, wherein
   the controller performs a weighting correction process that increases weighting to the brightness of the predetermined pixel in each image area, when a size of the image area after a correction process in which distortion aberration of the captured image is corrected is larger than the size of the image area before the correction process, and the controller performs a weighting correction process that decreases the weighting to the brightness of the predetermined pixel in each image area, when the size of the image area after the correction process is smaller than the size of the image area before the correction process.

7. A non-transitory computer-readable recording medium that contains a computer program that causes a computer to function as:

a controller configured to control exposure of an image capturing module by dividing a captured image captured by the image capturing module into a plurality of image areas, weighting brightness of a predetermined pixel in each of the image areas, and being based on the weighted brightness of the predetermined pixel in each image area, wherein the controller performs a weighting correction process that increases weighting to the brightness of the predetermined pixel in each image area, when a size of the image area after a correction process in which distortion aberration of the captured image is corrected is larger than the size of the image area before the correction process, and the controller performs a weighting correction process that decreases the weighting to the brightness of the predetermined pixel in each image area, when the size of the image area after the correction process is smaller than the size of the image area before the correction process.

* * * * *